US009813926B2

(12) United States Patent
Li et al.

(10) Patent No.: US 9,813,926 B2
(45) Date of Patent: Nov. 7, 2017

(54) METHODS, APPARATUSES, AND COMPUTER PROGRAM PRODUCTS FOR OUT-OF-BAND SENSING IN A COGNITIVE LTE SYSTEM

(75) Inventors: Haitao Li, Beijing (CN); Haipeng Lei, Beijing (CN); Kodo Shu, Beijing (CN); Rui Wang, Shanghai (CN); Honglin Hu, Shanghai (CN); Huiyue Yi, Shanghai (CN); Xiumei Yang, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 14/387,011

(22) PCT Filed: Mar. 26, 2012

(86) PCT No.: PCT/CN2012/073036
§ 371 (c)(1),
(2), (4) Date: Feb. 18, 2015

(87) PCT Pub. No.: WO2013/143053
PCT Pub. Date: Oct. 3, 2013

(65) Prior Publication Data
US 2015/0156650 A1 Jun. 4, 2015

(51) Int. Cl.
*H04W 40/12* (2009.01)
*H04W 72/12* (2009.01)
(Continued)

(52) U.S. Cl.
CPC ......... *H04W 24/08* (2013.01); *H04W 72/085* (2013.01); *H04W 16/14* (2013.01)

(58) Field of Classification Search
CPC ... H04W 24/08; H04W 72/085; H04W 40/12; H04W 72/1231; H04B 10/0795; H04B 10/07955; H04B 17/318
See application file for complete search history.

(56) References Cited

U.S. PATENT DOCUMENTS

2004/0192211 A1* 9/2004 Gallagher ......... H04M 3/42246
455/67.11
2008/0240267 A1* 10/2008 Hassan ................. H04W 72/08
375/260
(Continued)

FOREIGN PATENT DOCUMENTS

| CN | 101184324 A | 5/2008 |
| CN | 101459445 A | 6/2009 |

(Continued)

OTHER PUBLICATIONS

International Search Report dated Jan. 3, 2013, for PCT application No. PCT/CN2012/073036.
(Continued)

*Primary Examiner* — Andrew Wendell
(74) *Attorney, Agent, or Firm* — Mintz Levin Cohn Ferris Glovsky and Popeo, P.C.

(57) ABSTRACT

Provided are methods, corresponding apparatuses, and computer program products for performing out-of-band sensing on an unlicensed frequency band. A method comprises sending a configuration message for configuring measurement on at least one channel in a frequency band of a primary system; receiving a measurement report made based upon the configuration message; and determining the usability of the at least one channel based upon the measurement report, wherein the configuration message includes information regarding a respective predetermined threshold of energy detection or primary-system-feature detection, and the measurement report is for reception when a measured energy detection value or a measured primary-system-feature detection value of a received signal on the at least one channel is less than the respective predetermined threshold. With the claimed inventions, the spectrum efficiency would
(Continued)

be improved and interference between a secondary system and an LTE system could be alleviated.

15 Claims, 6 Drawing Sheets

(51) Int. Cl.
H04B 17/318 (2015.01)
H04W 24/08 (2009.01)
H04W 72/08 (2009.01)
H04W 16/14 (2009.01)

(56) References Cited

U.S. PATENT DOCUMENTS

| | | | | |
|---|---|---|---|---|
| 2010/0061315 A1* | 3/2010 | Cordeiro | ............ | H04W 72/082 |
| | | | | 370/329 |
| 2010/0086010 A1* | 4/2010 | Choi | ............ | H04W 72/02 |
| | | | | 375/132 |
| 2011/0183661 A1* | 7/2011 | Yi | ............ | H04W 24/10 |
| | | | | 455/422.1 |
| 2011/0223877 A1 | 9/2011 | Tillman et al. | | |
| 2011/0223911 A1* | 9/2011 | Xin | ............ | H04W 72/02 |
| | | | | 455/434 |
| 2011/0287794 A1* | 11/2011 | Koskela | ............ | H04W 28/08 |
| | | | | 455/509 |
| 2013/0121272 A1* | 5/2013 | Barbieri | ............ | H04W 72/08 |
| | | | | 370/329 |
| 2013/0205313 A1* | 8/2013 | Kim | ............ | H04W 16/14 |
| | | | | 725/14 |
| 2014/0073314 A1* | 3/2014 | Pradas | ............ | H04W 36/0088 |
| | | | | 455/422.1 |

FOREIGN PATENT DOCUMENTS

| | | |
|---|---|---|
| CN | 101640570 A | 2/2010 |
| KR | 20100037786 A | 4/2010 |
| WO | WO-2010142154 A1 | 12/2010 |

OTHER PUBLICATIONS

IEEE P802.22™/D0.1, "Draft Standard for Wireless Regional Area Networks Part 22: Cognitive Wireless RAN Medium Access Control (MAC) and Physical Layer (PHY) specifications: Policies and procedures for operation in the TV Bands", Dec. 2010.

3GPP TS 36.331, "3rd Generation Partnership Project; Technical Specification Group Radio Access network; Evolved Universal Terrestrial Radio Access (E-UTRA); Radio Resource control (RRC); Protocol specification", v10.3.0, Sep. 2011.

Yucek et al. "A survey of spectrum sensing algorithms for congnitive radio applications". IEEE Commications Surveys and Tutorials, Institute of Electrical and Electronics Engineers. Jan. 1, 2009; 11(1): 116-130.

* cited by examiner

METHODS, APPARATUSES, AND COMPUTER PROGRAM PRODUCTS FOR OUT-OF-BAND SENSING IN A COGNITIVE LTE SYSTEM

RELATED APPLICATION

This application is a national stage application, filed under 35 U.S.C. §371, of PCT Application No. PCT/CN2012/073036, filed on Mar. 26, 2012, the contents of which is incorporated herein by reference in its entirety.

FIELD OF THE INVENTION

Embodiments of the present invention generally relate to wireless communication techniques including the 3GPP (the 3rd Generation Partnership Project) LTE (Long Term Evolution) technique. More particularly, embodiments of the present invention relate to methods, apparatuses, and computer program products for out-of-band sensing in a cognitive LTE system.

BACKGROUND OF THE INVENTION

Various abbreviations that appear in the specification and/or in the drawing figures are defined as below:
 ATSC Advanced Television System Committee
 BS Base Station
 BPSK Binary Phase Shift Keying
 CA Carrier Aggregation
 CP Cyclic Prefix
 CR Cognitive Radio
 CDMA Code Division Multiple Access
 DTV Digital Television
 DFT Discrete Fourier Transform
 eNB evolved Node B
 FFT Fast Fourier Transform
 ISDB Integrated Services Digital Broadcasting
 OFDM Orthogonal Frequency Division Multiplexing
 PSD Power Spectral Density
 QP Quiet Period
 QPSK Quadrature Phase Shift Keying
 RSRP Reference Signal Receiving Power
 RSRQ Reference Signal Receiving Quality
 SQPSK Staggered Quadrature Phase-Shift Keying
 TVWS TV White Spaces
 UE User Equipment
 VSB Vestigial Side Band
 WLAN Wireless Local Network
 WiFi Wireless Fidelity
 WiMax Worldwide Interoperability for Microwave Access An LTE system has been accepted as a world-wide standard for wireless communications and it has capabilities of a peak download data rate of 1 Gbps, wide transmission bandwidth, low C-plane latency, increased user throughput and spectrum flexibility or the like. However, the LTE system also suffers from a bandwidth scarcity problem which has been very common in wireless communications. To alleviate this problem and boost spectrum efficiency, a CR technique has evoked considerable research interests lately because it is capable of efficiently utilizing unused "spectrum holes" on unlicensed bands without causing severe interference to primary users. Meanwhile, a CA technique is being standardized in the 3GPP as part of the LTE Release 10, which allows for aggregating non-contiguous spectrum fragments across multiple carriers. Therefore, incorporating CR features into the LTE system with the CA technique has become an efficient solution for solving the above spectrum scarcity problem.

Many researches with respect to the CR technique have been focusing on the TVWS. The database approach for TVWS access is considered as a tool to find available spectrum bands, which requires less investment other than an incumbent database that maintains data about used frequencies in the TV band. As compared to the database approach, spectrum sensing has its own advantages in respect of detecting more access opportunities for secondary systems working under a primary system. Besides, the database approach is always based upon coarse-grained allocation techniques and thus inferior to the spectrum sensing in determining whether a given channel is actually available. Furthermore, the spectrum sensing could be used to update and improve the database as appropriate.

In the CR-enabled networks, reliably obtaining available spectrum holes by the spectrum sensing (working independently or assisting the database) is crucial for secondary systems to access unlicensed bands opportunistically. As specified in IEEE 802.22 standard "IEEE P802.22™/D0.1, "Draft Standard for Wireless Regional Area Networks Part 22: Cognitive Wireless RAN Medium Access Control (MAC) and Physical Layer (PHY) specifications: Policies and procedures for operation in the TV Bands," which is incorporated herein by reference in its entirety, out-of-band spectrum sensing refers to the case when an incumbent sensing activity is carried out in those channels other than working channels, aiming at obtaining available spectrum resource. This does not need a network level QP, and is a similar procedure to an inter-frequency measurement in LTE systems.

As specified in TS 36.3313GPP V10.3.0 (2011-09) Evolved Universal Terrestrial Radio Access (E-UTRA); Radio Resource Control (RRC) (Release 10), which is also incorporated herein by reference in its entirety, a UE can be requested to perform intra-frequency, inter-frequency or inter-RAT measurements, and the measurement configuration includes the following parameters: measurement objects, reporting configurations, measurement identities, quantity configurations, and measurement gaps. According to different measurement purposes, the criteria for triggering the UE to send a measurement report are different. For instance, if the trigger type is set to event, Events A1/2 are for serving cell measurements, Events A3/4/5/6 are for intra/inter-frequency measurements and CA, as well as Event B1/2 are for inter-RAT measurements. However, in a cognitive LTE network, the conventional inter-frequency measurements cannot enable out-of-band spectrum sensing. This is because the measurement quantity of conventional inter-frequency measurement is RSRP/RSRQ in neighbor cells, and the decision condition is always dependent on whether the quality of a neighbor cell is better than a predetermined threshold. However, for the out-of-band spectrum sensing, the sensing target is the energy or feature of a received signal on an unlicensed band, where there may not be any reference signals like those transmitted in the LTE system. Therefore, the out-of-band spectrum sensing cannot be exploited simply by reusing the current measurement configuration in the LTE system, and new measurement configurations should be developed for cognitive radio based LTE systems In view of the above, it would be desirable to configure out-of-band sensing in a cognitive LTE network without significant changes to the existing LTE architecture and spectrum efficiency could be improved by such out-of-band sensing. Further, the out-of-band sensing would not bring about interference to the primary or secondary system.

SUMMARY OF THE INVENTION

Therefore, there is a need in the art to provide for an efficient way of performing out-of-band sensing in a cognitive LTE network such that communication channels licensed to a primary system could be used by the LTE network without interference therebetween.

In an exemplary embodiment of the present invention, a method is provided, which comprises sending a configuration message for configuring measurement on at least one channel in a frequency band of a primary system. The method also comprises receiving a measurement report made based upon the configuration message. In addition, the method comprises determining the usability of the at least one channel based upon the measurement report, wherein the configuration message includes information regarding a respective predetermined threshold of energy detection or primary-system-feature detection, and the measurement report is for reception when a measured energy detection value or a measured primary-system-feature detection value of a received signal on the at least one channel is less than the respective predetermined threshold.

In one embodiment, the configuration message includes the information regarding the respective predetermined threshold of the energy detection and the method comprises receiving the measurement report sent when the measured energy detection value is less than the respective predetermined threshold and determining that the at least one channel is usable for cellular communication based upon the measurement report.

In another embodiment, the configuration message includes information regarding the respective predetermined threshold of the energy detection and the method comprises receiving the measurement report sent when the measured energy detection value is less than the respective predetermined threshold; sending a further configuration message including information regarding the respective predetermined threshold of the primary-system-feature detection; receiving a further measurement report sent when a measured primary-system-feature detection value is less than the respective predetermined threshold; and determining the primary system is absent based upon the further measurement report.

In an additional embodiment, the configuration message includes information regarding the respective predetermined threshold of the energy detection and the method comprises receiving the measurement report sent when a measured energy detection value is less than the respective predetermined threshold; sending a further configuration message for periodical reception of a measurement report regarding a measured primary-system-feature detection value; periodically receiving the measurement report regarding the measured primary-system-feature detection value; and determining whether the primary system is present based upon the periodically received measurement report.

In a further embodiment, signal strength of the primary system is lower than noise strength of a UE.

In one embodiment, the configuration message includes information regarding the respective predetermined threshold of the primary-system-feature detection and the method comprises receiving the measurement report sent when the primary-system-feature detection value is less than the respective predetermined threshold; determining, based upon the measurement report, that the at least one channel has a likelihood of being used by a potential secondary system; sending a further configuration message for periodical reception of a measurement report regarding a measured secondary-system-feature detection value; periodically receiving the measurement report regarding the measured secondary-system-feature detection value; and determining whether to share the at least one channel with the potential secondary system based upon the periodically received measurement report.

In an additional embodiment, the configuration message includes information regarding the respective predetermined threshold of the energy detection and the method comprises sending, if no reception of a measurement report sent when the energy detection value is less than the respective predetermined threshold, a further configuration message including information regarding the respective predetermined threshold of the primary-system-feature detection; receiving a measurement report sent when the primary-system-feature detection value is less than the respective predetermined threshold; and determining the primary system is absent based upon the received measurement report.

In yet another embodiment, the configuration message includes information regarding the respective predetermined threshold of the energy detection and the method comprises sending, if no reception of a measurement report sent when the energy detection value is less than the respective predetermined threshold, a further configuration message for periodical reception of a measurement report regarding a measured primary-system-feature detection value; periodically receiving the measurement report regarding the measured primary-system-feature detection value; and determining whether the primary system is present based upon the periodically received measurement report.

In a further embodiment, no measurement report is for reception and the method further comprises sending a further configuration message for periodical reception of a measurement report regarding a measured primary-system-feature detection value or a measured secondary-system-feature detection value; periodically receiving the measurement report regarding the measured primary-system-feature detection value or the measured secondary-system-feature detection value; determining whether the primary system or the secondary system is present based upon the periodically received measurement report; and determining, if the primary system is absent and the secondary system is present, whether to share the at least one channel with the secondary system.

In one embodiment, the measurement report includes information indicative of the at least one channel.

In another exemplary embodiment of the present invention, a method is provided, which comprises measuring an energy detection value or a primary-system-feature detection value of a received signal on at least one channel in a frequency band of a primary system. The method also comprises sending a measurement report when the measured energy detection value or primary-system-feature detection value of the received signal on the at least one channel is less than a respective predetermined threshold of energy detection or primary-system-feature detection.

In another embodiment, the measuring is based upon a configuration message received from a BS and the configuration message includes the respective predetermined threshold of the energy detection or primary-system-feature detection.

In an additional embodiment, the sending the measurement report comprises sending the measurement report when the measured energy detection value is less than the respective predetermined threshold and the method further comprises measuring the primary-system-feature detection value of the received signal on the at least one channel; and sending a measurement report when the primary-system-feature detection value is less than the respective predetermined threshold.

In a further embodiment, the sending the measurement report comprises sending the measurement report when the measured energy detection value is less than the respective predetermined threshold and the method further comprises measuring the primary-system-feature detection value of the received signal on the at least one channel; and periodically sending a measurement report regarding the primary-system-feature detection value.

In yet another embodiment, signal strength of the primary system is lower than noise strength of a UE.

In a further embodiment, the measured energy detection value and primary-system-feature detection value are not less than the respective predetermined thresholds and the method further comprises measuring the primary-system-feature detection value of the received signal on the at least one channel; and periodically sending a measurement report regarding the primary-system-feature detection value.

In one embodiment, the primary-system-feature detection value is less than the respective predetermined threshold and the method further comprises: measuring a secondary-system-feature detection value of the received signal on the at least one channel; and periodically sending a measurement report regarding the secondary-system-feature detection value.

In another embodiment, the periodically sending is based upon a further configuration message received from a BS and the further configuration message is for configuring periodical sending of a measurement report.

In a further embodiment, the measurement report includes information indicative of the at least one channel.

In an additional exemplary embodiment of the present invention, an apparatus is provided, which comprises means for sending a configuration message for configuring measurement on at least one channel in a frequency band of a primary system. The apparatus also comprises means for receiving a measurement report made based upon the configuration message. In addition, the apparatus comprises means for determining the usability of the at least one channel based upon the measurement report, wherein the configuration message includes information regarding a respective predetermined threshold of energy detection or primary-system-feature detection, and the measurement report is for reception when a measured energy detection value or a measured primary-system-feature detection value of a received signal on the at least one channel is less than the respective predetermined threshold In a further exemplary embodiment of the present invention, an apparatus is provided, which comprises means for measuring an energy detection value or a primary-system-feature detection value of a received signal on at least one channel in a frequency band of a primary system. The apparatus also comprises means for sending a measurement report when the measured energy detection value or primary-system-feature detection value of the received signal on the at least one channel is less than a respective predetermined threshold of energy detection or primary-system-feature detection.

In one exemplary embodiment of the present invention, an apparatus is provided, which comprises at least one processor and at least one memory including computer program code. The memory and the computer program code are configured to cause the apparatus to send a configuration message for configuring measurement on at least one channel in a frequency band of a primary system. The memory and the computer program code are also configured to cause the apparatus to receive a measurement report made based upon the configuration message. In addition, the memory and the computer program code are configured to cause the apparatus to determine the usability of the at least one channel based upon the measurement report, wherein the configuration message includes information regarding a respective predetermined threshold of energy detection or primary-system-feature detection, and the measurement report is for reception when a measured energy detection value or a measured primary-system-feature detection value of a received signal on the at least one channel is less than the respective predetermined threshold.

In another exemplary embodiment of the present invention, an apparatus is provided, which comprises at least one processor and at least one memory including computer program code. The memory and the computer program code are configured to cause the apparatus to measure an energy detection value or a primary-system-feature detection value of a received signal on at least one channel in a frequency band of a primary system. The memory and the computer program code are also configured to cause the apparatus to send a measurement report when the measured energy detection value or primary-system-feature detection value of the received signal on the at least one channel is less than a respective predetermined threshold of energy detection or primary-system-feature detection.

In another exemplary embodiment of the present invention, a computer program product is provided, which, comprises at least one computer readable storage medium having a computer readable program code portion stored thereon. The computer readable program code portion comprises program code instructions for sending a configuration message for configuring measurement on at least one channel in a frequency band of a primary system. The computer readable program code portion also comprises program code instructions for receiving a measurement report made based upon the configuration message. In addition, the computer readable program code portion comprises program code instructions for determining the usability of the at least one channel based upon the measurement report, wherein the configuration message includes information regarding a respective predetermined threshold of energy detection or primary-system-feature detection, and the measurement report is for reception when a measured energy detection value or a measured primary-system-feature detection value of a received signal on the at least one channel is less than the respective predetermined threshold.

In one exemplary embodiment of the present invention, a computer program product is provided, which, comprises at least one computer readable storage medium having a computer readable program code portion stored thereon. The computer readable program code portion comprises program code instructions for measuring an energy detection value or a primary-system-feature detection value of a received signal on at least one channel in a frequency band of a primary system. The computer readable program code portion also comprises program code instructions for sending a measurement report when the measured energy detection value or primary-system-feature detection value of the received signal on the at least one channel is less than a respective predetermined threshold of energy detection or primary-system-feature detection.

According to certain embodiments of the present invention, by means of setting a new measurement configuration for cognitive radio based LTE systems, the LTE system could detect other interferences on unlicensed bands where other systems (e.g., secondary systems) may operate and thus the proposed new measurements enable better use of unlicensed or TVWS bands. For instance, the LTE system is capable of relatively accurately ascertaining the status of the networks and may opportunistically access unlicensed bands through the new measurement configuration. Further, it is easy to specify the proposed measurement mechanism without significantly affecting the existing LTE measurement approaches. In addition, flexibility and efficiency for use of the spectrum resources would be ameliorated.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The embodiments of the invention that are presented in the sense of examples and their advantages are explained in greater detail below with reference to the accompanying drawings, in which.

DETAILED DESCRIPTION OF EMBODIMENTS

Figure 1:
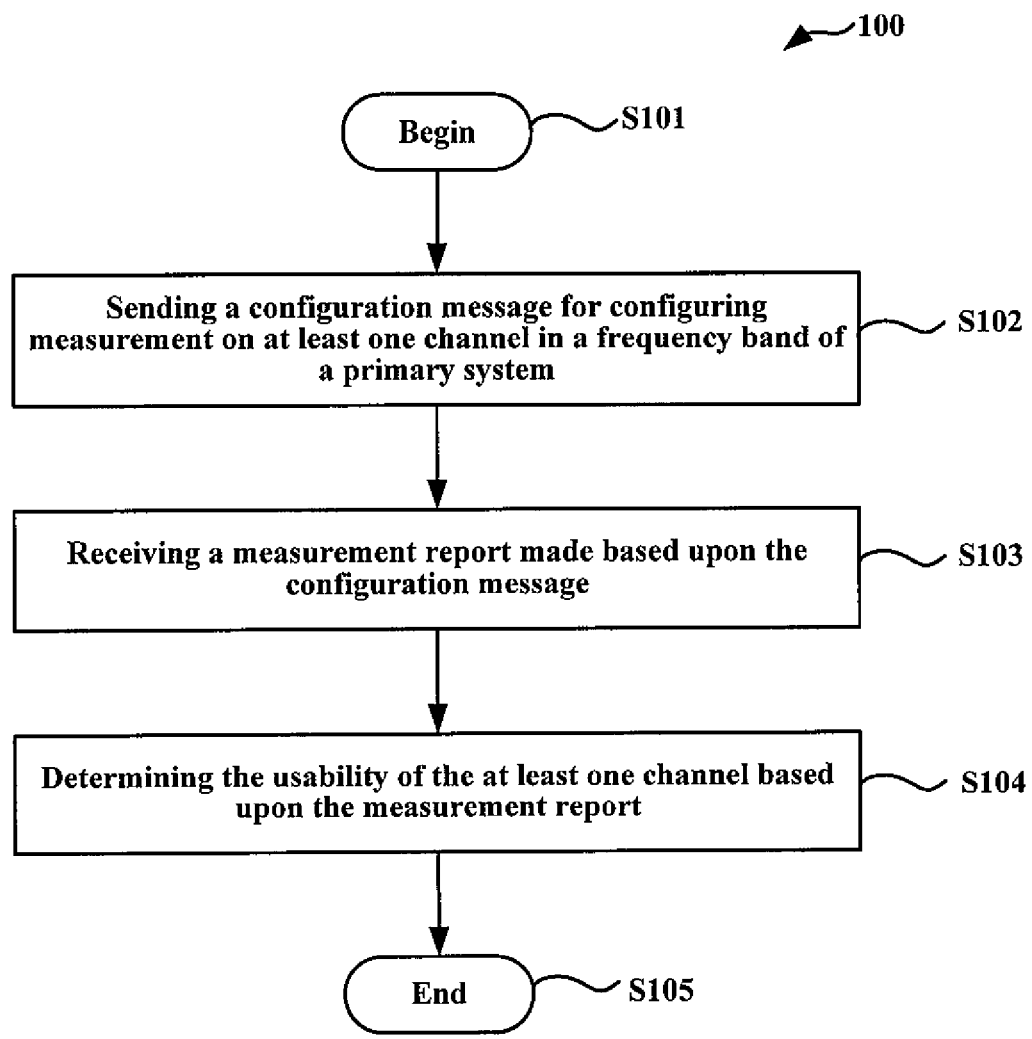
FIG. 1 is a flow chart schematically illustrating a method for performing out-of-band sensing on an unlicensed frequency band from a BS perspective according to an embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the invention, but their usage does not delimit the invention. For example, a BS in the present invention may refer to one of a NB, an eNB, a base transceiver station, a radio BS, and the like and thus they may be used interchangeably throughout the specification and claims as appropriate.

Embodiments of the present invention propose an efficient mechanism of out-of-band sensing in a cognitive LTE system, which generally involves sensing configuring, out-of-band sensing, and sensing results reporting procedures. In particular, various embodiments of the present invention enable, through energy or feature detection, a cognitive measurement procedure for the out-of-band sensing on unlicensed bands in cognitive LTE systems. At the outset, a BS (e.g., an eNB) may obtain a list of possible idle channels on unlicensed bands such as a C-band or a TVWS band, and information about their usage. This could be implemented by e.g., accessing a database such as one in the TVWS or based upon historical or experimental data. Then, the eNB may configure, via one or more configuration messages (i.e., signaling messages), one or more UEs to carry out cognitive measurement procedures for the out-of-hand sensing of the channels on the unlicensed bands.

Based upon the results of the cognitive measurement procedures, the eNB may determine whether the measured channels are useable for cellular communications. The cognitive measurement procedure for the out-of-band sensing has two main phases: first, the eNB configures the UE to selectively perform two kinds of event-triggered measurement procedures, as referred to as C1 and C2 events for simplicity, to detect whether the channel is idle or may have been occupied by a potential secondary system; second, if the sensed channel has been occupied by the secondary system, the eNB may further distinguish the secondary system by configuring the UE to carry out a further periodical measurement report procedure. Afterwards, the eNB may collect or receive measurement reports from UEs and make a final decision on the status and usability of the sensed channel. Optionally, the eNB may report the final decision to the database for update.

Embodiments of the present invention will be described in detail as below.

FIG. 1 is a flow chart schematically illustrating a method 100 for performing out-of-band sensing on an unlicensed frequency band from a BS perspective according to an embodiment of the present invention. As illustrated in FIG. 1, the method 100 begins at step S101 and proceeds to step S102 at which the method 100 sends a configuration message for configuring measurement on at least one channel in a frequency band of a primary system. The configuration message includes information regarding a respective predetermined threshold of energy detection or primary-system-feature detection, and the measurement report is for reception when a measured energy detection value or a measured primary-system-feature detection value of a received signal on the at least one channel is less than the respective predetermined threshold.

In particular, the BS may configure, via the configuration message, different parameters regarding the out-of-band sensing to the UE, which may include but are not limited to: a) unlicensed bands or channels to be sensed in a frequency band (e.g. a TV band, a radar band, and a satellite C-band) as licensed to primary systems; b) quantities to be measured (e.g. energy or feature detection values of a received signal on the band or channel to be sensed); c) reporting criterions or types, e.g., event-triggered (e.g., C1 or C2 event as discussed later) or periodical reporting. Then, it is quite straightforward to set an appropriate time to trigger, a measurement gap, and etc. In some implementations, information about the signal features of a target primary system or a potential secondary system, which may be working under the target primary system, and information about a possible available channel list on unlicensed bands may be retrieved from a database (such as used by the TVWS), if any.

As noted previously, to enable an efficient reporting mechanism, two event-triggered reporting procedures are proposed, in which one procedure is triggered on the condition that the energy detection value of the received signal on the channel is less than a predetermined threshold and the other one is triggered on the condition that the feature detection value of the received signal at issue is less than a predetermined threshold. For simplicity, these two conditions are referred to hereinafter as events "C1" and "C2," as will be discussed in detail as below.

Event C1

Energy Detection Value being Lower than a Predetermined Threshold

When a UE, which has a capability referred to as cognitive radio capability, has been configured by an eNB to report a measurement report for the out-of-band sensing upon a trigger of the event C1, the UE would send a measurement report regarding the energy detection value when the following inequality C1-1 is fulfilled:

$$Med+Hys<Ted, \tag{C1-1}$$

where an item Med denotes a measurement result of the sensed or measured channel by energy detection; an item Hys denotes a hysteresis parameter for the C1 event; and an item Ted denotes a threshold parameter of a sensing algorithm for the event C1.

Based upon the measurement report, the BS would determine that the sensed channel may be idle and thus suitable for cellular communications, e.g., for CA or opportunistic secondary access. Unlike the existing neighboring cell RSRP/RSRQ measurement whose resulting measurement report is triggered if the measured value is greater than a predetermined threshold, embodiments of the present invention propose triggering the reporting if the measured value is less than a predetermined threshold so as to efficiently determine the presence of the primary system.

Alternatively or additionally, if the inequality C1-1 is regarded as an entering condition for the event C1, i.e., the sensed channel is accepted as an usable unlicensed channel by the BS, then a leaving condition for the event C1 may be defined as the below inequality C1-2:

$$Med-Hys>Ted, \tag{C1-2}$$

In some implementations, once the energy detection value, which had met the inequality C-1, is now meeting the inequality C1-2, the UE may also send to the BS a measurement report. Based upon the received measurement report, the BS would be aware that the energy detection value of the channel has become larger than before and this may imply that the primary system may be present and thus the sensed channel cannot be used any longer by other systems lest incurring interference. In other words, it is time for this sensed channel to "leave" (i.e., be removed) from a previously recorded list of usable unlicensed channels.

In practice, the threshold Ted is set not to be the target sensitivity for the UEs to detect signals of the primary system but a little looser or higher than the sensitivity. This is because the primary system detection sensitivity may be much lower than the local noise in UEs. For example, the target sensitivity as specified in IEEE 802.22 for the devices to detect TV signals is directed to signal strength of −116 dBm, and the level of the local noise in UEs of the LTE systems is −90 dBm. This is to say, when the primary TV transmitter is far away from a certain UE, its signal may be submerged under the local noise of the UE. However, the TV receiver may be close to the UE. If this is the case, the UE cannot detect the existence of the primary TV system and its transmission will cause severe interference to the adjacent primary TV user. In view of this, it would be preferable to set a looser energy threshold first and then utilize a feature detection (i.e., on a C2 event basis) as a supplement to get rid of false alarms, and also distinguish a primary system and other secondary systems.

Event C2

Signal Feature Detection Value being Lower than a Predetermined Threshold

Inequalities C2-1 and C2-2 as below are also introduced into the event C2-1 to assist the UE in determining whether or not to send a measurement report to the BS.

$$Mfd+Hys<Tfd, \tag{C2-1}$$

where an item Mfd denotes an measurement result of the feature detection of the sensed channel; an item Hys denotes a hysteresis parameter for the event C2; and an item Tfd denotes a threshold parameter of a sensing algorithm for the event C2.

Once the inequality C2-1 is met, i.e., the measured feature detection value Mfd is less than the predetermined threshold Tfd, the UB may send a measurement report to the BS. Based upon the measurement report, the BS may determine that the primary system may be absent and potential secondary systems may exist. Thus, the BS may conduct further actions, such as configuring the UE to perform measurements of feature detection values of the secondary system and to periodically report the measurement results regardless of the event C2. Similar to the event C1, if the inequality C2-1 is regarded as an entering condition and then the below inequality C2-2 may be regarded as a leaving condition:

$$Mfd-Hys>Tfd, \tag{C2-2}$$

Returning to FIG. 1, subsequent to completing step S102, the method 100 proceeds to step S103, at which the method 100 receives a measurement report made based upon the configuration message. Upon receipt of the measurement report, the method 100 proceeds to step S104, at which the method 100 determines the usability of the at least one channel based upon the measurement. Finally, the method 100 ends at step S105.

In some embodiments, the configuration message includes the information regarding the respective predetermined threshold of the energy detection (e.g., the item Ted in the inequality C1-1) and the method 100 receives the measurement report sent when the measured energy detection value is less than the respective predetermined threshold and determines that the at least one channel is usable for cellular communication based upon the measurement report. In other words, the BS receives the measurement report sent on an event C1 basis.

In some embodiments, for those primary systems whose signal strength is lower than noise strength of the UE, e.g., a TV system, the configuration message includes information regarding the respective predetermined threshold of the energy detection and the method 100 receives the measurement report sent when the measured energy detection value is less than the respective predetermined threshold (i.e., triggered by a C1 event). Then, the method 100 sends a further configuration message including information regarding the respective predetermined threshold of the primarysystem-feature detection (e.g., the item Tfd in the inequality C2-1). Upon receipt of a further measurement report sent when a measured primary-system-feature detection value is less than the respective predetermined threshold (i.e., triggered by a C2 event), the method 100 determines the primary system is absent based upon the further measurement report.

Alternatively, upon receipt of the measurement report sent when a measured energy detection is less than the respective predetermined threshold, the method 100 sends a further configuration message for periodical reception of a measurement report regarding a measured primary-system-feature detection value. Afterwards, upon periodical receipt of the measurement report regarding the measured primary-system-feature detection value, the method 100 determines whether the primary system is present based upon the periodically received measurement report.

By means of the two manners as discussed above, it is likely to detect primary systems with weaker signal strength than the local noise of the HE.

In some embodiments, the configuration message includes information regarding the respective predetermined threshold of the primary-system-feature detection and the method receives the measurement report sent when the primary-system-feature detection value is less than the respective predetermined threshold (i.e., on a C2 event basis) and then determines, based upon the measurement report, that the at least one channel has a likelihood of being used by a potential secondary system. After that, the method 100 sends a further configuration message for periodical reception of a measurement report regarding a measured secondary-system-feature detection value. Upon periodical receipt of the measurement report regarding the measured secondary-system-feature detection value, the method 100 determines whether to share the at least one channel with the potential secondary system based upon the periodically received measurement report. For example, the method 100 may determine whether the LTE system can be co-coexisted with the secondary system by interference coordination. For instance, if the secondary system is a WiFi system, then it can be determined that both the LET system and the WiFi system may share this sensed channel. If the secondary system, however, is a wireless microphone system, then it can be determined that the LTE system stands no chance of sharing the channel with the microphone system.

In some embodiments, the configuration message includes information regarding the respective predetermined threshold of the energy detection and the method 100 sends, if no reception of a measurement report sent when the energy detection value is less than the respective predetermined threshold (e.g., due to a large measurement value or measurement reporting failure), a further configuration message including information regarding the respective predetermined threshold of the primary-system-feature detection. Upon receipt of a measurement report sent when the primary-system-feature detection value is less than the respective predetermined threshold (i.e., triggered by a C2 event), the method 100 determines the primary system is absent based upon the received measurement report.

It would be understood that no reception of the measurement report triggered by a C1 event implies a possibility of a primary system being present and that applying feature detection to the primary system would be a straightforward way to ascertain the existence of the primary system.

In some embodiments, the configuration message includes information regarding the respective predetermined threshold of the energy detection and the method 100 sends, if no reception of a measurement report sent when the energy detection value is less than the respective predetermined threshold, a further configuration message for periodical reception of a measurement report regarding a measured primary-system-feature detection value. Upon periodical receipt of the measurement report regarding the measured primary-system-feature detection value, the method 100 determines whether the primary system is present based upon the periodically received measurement report.

In some embodiments, no measurement report is for reception and the method 100 sends a further configuration message for periodical reception of a measurement report regarding a measured primary-system-feature detection value or a measured secondary-system-feature detection value. Upon receipt of the measurement report regarding the measured primary-system-feature detection value or the measured secondary-system-feature detection value, the method 100 determines whether the primary system or the secondary system is present based upon the periodically received measurement report. After that, the method 100 determines, if the primary system is absent and the secondary system is present, whether to share the at least one channel with the secondary system.

In some embodiments, the measurement report includes information indicative of the at least one channel.

As will be clear from the above discussion, unlike a prior art measurement report, which generally reports the information regarding the neighboring cell, the measurement report of the present invention includes information indicative of the at least one sensed or measured channel. In other words, a specific frequency point is reported to the BS in a straightforward way.

From the above discussion with respect to various embodiments of the present invention, it would be understood that (coarse) energy or (fine) feature detection may be applied in combination with the reporting trigger of C1 or C2 event and in some instances, the resulting measurement report may also be sent periodically. In this way, a primary system can be accurately identified and potential interference between the primary system and the LTE system may be minimized. Meanwhile, valuable spectrum resources would be utilized in a highly-efficient manner.

Figure 2:
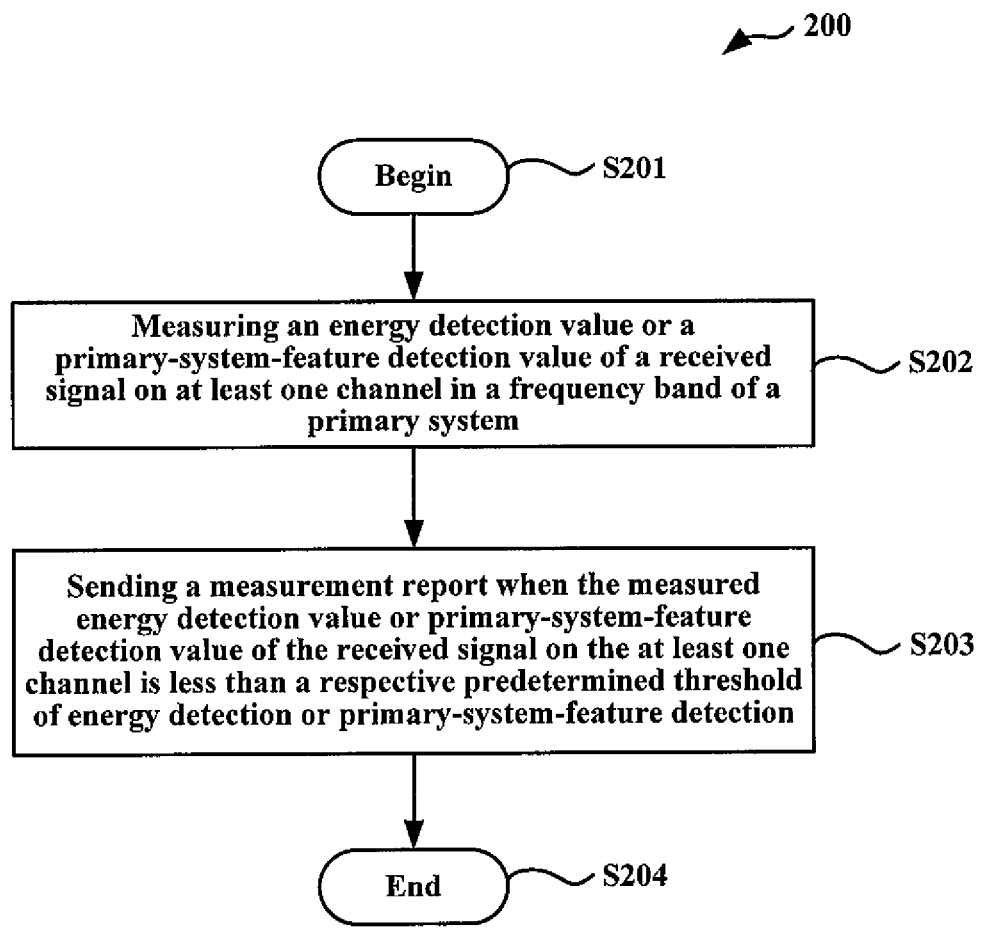
FIG. 2 is a flow chart schematically illustrating a method for performing out-of-band sensing on an unlicensed frequency band from a UE perspective according to another embodiment of the present invention.

FIG. 2 is a flow chart schematically illustrating a method 200 for performing out-of-band sensing on an unlicensed frequency band from a UE perspective according to another embodiment of the present invention. As illustrated in FIG. 2, the method 200 begins at step S201, and advances to step S202, at which the method 200 measures an energy detection value or a primary-system-feature detection value of a received signal on at least one channel in a frequency band of a primary system. Following measurements of the energy detection value or the primary-system-feature detection value of the received signal, the method 200 proceeds to step S203, at which the method 200 sends a measurement report when the measured energy detection value or primary-system-feature detection value of the received signal on the at least one channel is less than a respective predetermined threshold of energy detection or primary-system-feature detection (i.e., on a C1 or C2 event basis). Finally, the method 200 ends at step S204.

In some embodiment, the measuring is based upon a configuration message received from a BS and the configuration message includes the respective predetermined threshold of the energy detection or primary-system-feature detection.

In some embodiments, for a primary system whose signal strength is lower than noise strength of a UE, the sending the measurement report to the BS as illustrated in step S203 comprises sending the measurement report when the measured energy detection value is less than the respective predetermined threshold and the method 200 further measures the primary-system-feature detection value of the received signal on the at least one channel. After the measurement, the method 200 sends a measurement report when the primary-system-feature detection value is less than the respective predetermined threshold. Alternatively, after the measurement, the method 200 periodically sends a measurement report regarding the primary-system-feature detection value.

In some embodiments, the measured energy detection value and primary-system-feature detection value are not less than the respective predetermined thresholds (i.e., C1 and C2 events are not met) and the method 200 further measures the primary-system-feature detection value of the received signal on the at least one channel and periodically sends a measurement report regarding the primary-system-feature detection value.

In some embodiments, the primary-system-feature detection value is less than the respective predetermined threshold and the method 200 further measures a secondary-system-feature detection value of the received signal on the at least one channel and periodically sends a measurement report regarding the secondary-system-feature detection value.

In the above some embodiments, the periodically sending the measurement report is based upon a further configuration message received from a BS and the further configuration message is for configuring periodical sending of a measurement report. In addition, the measurement report as sent by the UE to the BS may include information indicative of the at least one channel.

The foregoing has discussed some exemplary embodiments of the present invention from a UE point of view and the contents (such as details of C1 or C2 event) identical to those previously discussed in connection with FIG. 1 are omitted herein for simplicity. For a better understanding of the present invention, below are examples of signal feature detection or measurement of the primary and secondary systems.

Example 1: Signal Feature Detection of a Primary System

If the sensed unlicensed band is a TV band, the primary signals could be ATSC (North America), DTV-B (Europe), or ISDB (Japan) signals. Here how the UE performs the feature detection for an ATSC signal will be exemplarily discussed as below.

The ATSC signal has a number of features, such as PN sequence, pilot, segment-synch characteristic, and cyclostationarity property and so on. As specified in 802.22 standards, a pilot detection method is suggested for TV signals detection.

The ATSC signal uses a 8-VSB modulation with signal levels (−7, −5, −3, −1, 1, 3, 5, 7). A DC offset of 1.25 is added to this at baseband to effectively create a small pilot signal to enable carrier recovery at the receiver. Upon completion of the digital transition, there will be only two possible pilot frequencies: 309440.6 Hz and 328843.6 Hz. The difference between these two pilot frequencies is approximately 19.4 kHz.

For UE end that performs the feature detection to check whether the pilot signal exists or not, it should: 1) estimate the PSD of the pilot frequency on unlicensed band. The midpoint between the two pilot frequencies is down converted to DC and the signal is filtered with a narrow-band low-pass filter. The filter double-sided bandwidth needs to be more that 19.4 kHz to ensure that the pilot signal is within the bandwidth of the filter. For instance, the PSD can be estimated using a periodogram which is based upon the DFT and can be implemented efficiently using the FFT; 2) find the frequency of the maximum of the PSD estimate which should be the ATSC pilot. Then compare this estimated pilot frequency with the real pilot frequencies, and calculate the similarity between them.

In this case, the feature detection value of the primary signal is the similarity between the estimated ATSC pilot frequency and real one, and if this feature detection value is smaller than a predetermined threshold, then UE reports the result by the event C2, meaning that the primary signal or system is not present.

Example 2: Signal Feature Detection of a Secondary System

In secondary system coexistence scenario on an unlicensed band, there may be multiple potential secondary systems, such as WLAN, Bluetooth or other cellular systems. The set of possible systems and their transmission parameters might be obtained as prior knowledge to assist cognitive devices in performing feature detection. These parameters include bandwidths, modulation types, duplexing, and multiple accessing methods and so on. For examples, CDMA systems have dedicated spreading codes for pilot and synchronization channels and OFDM packets have preambles for packet acquisition. Different types of modulated signals (such as BPSK, QPSK, and SQPSK) that have identical PSD functions may have highly distinct spectral correlation functions. Furthermore, stationary noise and interference exhibit no spectral correlation. These signatures can be used to detect secondary systems on the sensed unlicensed band.

If the possible secondary system is WiFi or WiMax. They are both OFDM systems, but the frame structure and the length of the CP are different. Therefore, CP-based autocorrelation detection can identify them.

For UE end, it should perform autocorrelation processing for the received signal on the sensed band, then obtain the interval and amplitude value of correlation peak. Take the correlation peak interval as a secondary signal feature, and then the similarity value between it and prior knowledge is calculated. If this feature detection value is less than a predetermined threshold, then UE reports the result by e.g., the event C2, meaning that the secondary signal does not exist.

Although examples regarding how to measure feature detection values are discussed herein, a person skilled in the art can understand from the teaching and disclosure of the embodiments of the present invention that existing energy detection, spectrum sensing and decision-making algorithms may be applied, mutatis mutandis, to the present invention. For example, for the energy detection, a person skilled in the art can apply any suitable approaches to directly measure the energy of the received signal on the channel to be sensed and then compare the measured energy value to the predetermined threshold.

Figure 3:
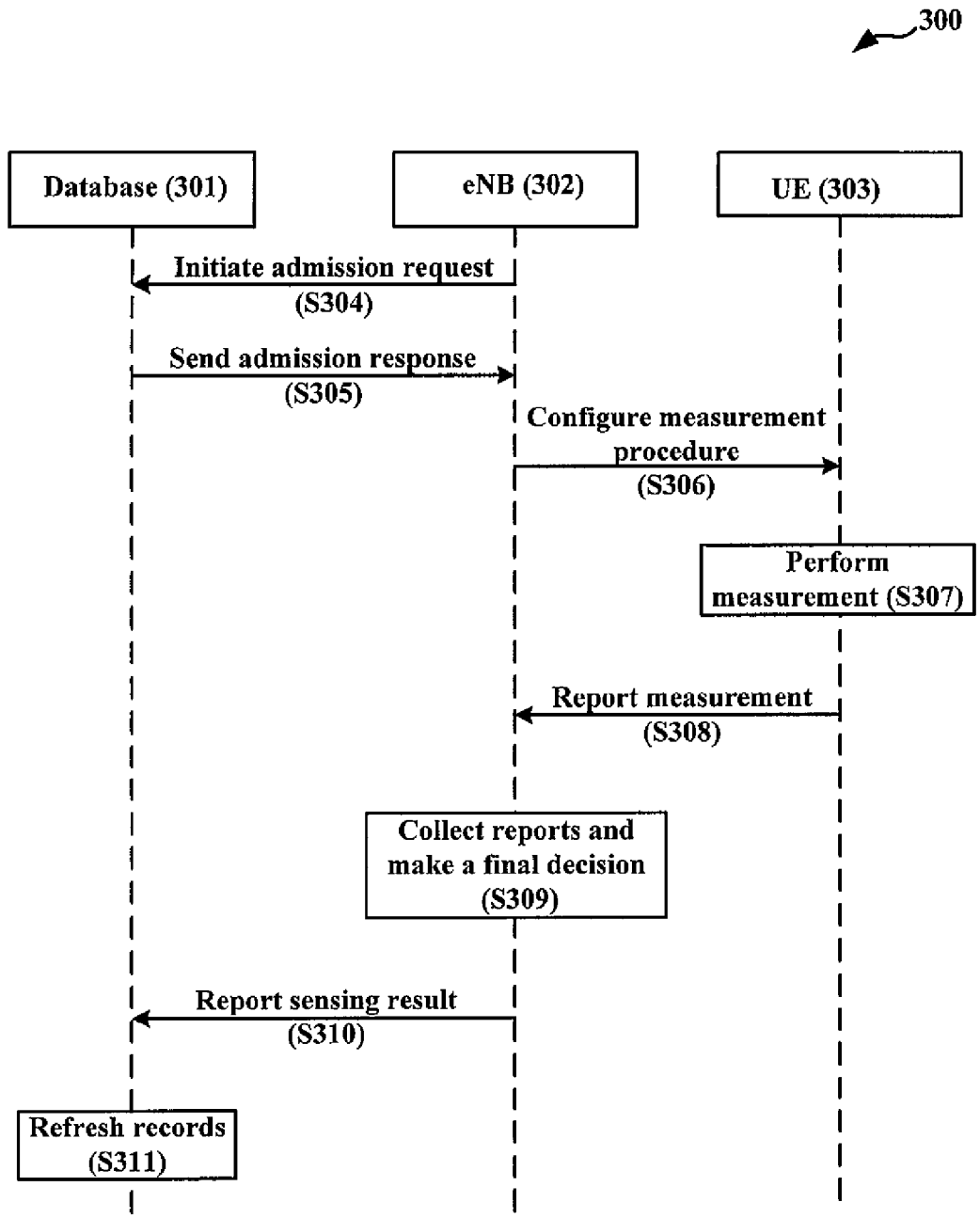
FIG. 3 schematically illustrates signaling process of out-of-band sensing in a cognitive LET system according to an embodiment of the present invention.

FIG. 3 schematically illustrates signaling process 300 of out-of-band sensing in a cognitive LET system according to an embodiment of the present invention. As illustrated in FIG. 3, the process 300 begins at step S304 wherein an eNB 302 sends or initiates an admission request to a database 301 such as one used in the TVWS. Then, the process 300 proceeds to step S305 at which the database 301 sends an admission response to the eNB 302, wherein the admission response may include but not be limited to a possible available or target channel list and information about a target primary system and other secondary systems. Upon receipt of the admission response, the process 300 proceeds to step S306, at which the eNB 302, based upon the admission response, configure a periodical or event triggered measurement procedure for a UE 303 via a configuration message.

Upon receipt of the configuration information, the UE 303 may, at step S307 measure energy, primary-system-feature, or secondary-system-feature detection values of a received signal on the channel to be sensed. Subsequent to the measurement of the values, the process 300 advances to step S308, at which the UE 303 sends the respective measurement report event-triggered or periodically to the eNB 302. At step S309, the eNB 302 collects measurement reports from a plurality of UEs including the UE 303 and makes a final decision on a current status of the sensed channel, i.e., whether the sensed channel is idle or not or whether it has been occupied by other secondary systems, in which case the eNB 302 may further configure a periodical feature detections aimed at distinguishing or identifying the secondary systems and then schedule the coexistence strategy between the secondary systems, such as retreat, negotiation or competition. The process 300 then advances to step S310, at which the eNB 302 reports the sensing results to the database 301, which, in turn, at step S311, refreshes or updates the records.

The foregoing briefly discusses the signaling flow of the out-of-band sensing of some embodiments of the present invention. However, it is only for illustrative purposes and some steps could be omitted. For example, when the database is not available or even does not exist, then steps S304, S305, S310, and S311 should be omitted. In this case, the feature-related information may be obtained by the eNB's historical information or empirical values. Additionally, although not discussed above, it should be noted that multiple measurement instances may, as appropriate, arise among steps S306-S309, as detailed in embodiments in relation to FIGS. 1 and 2.

Figure 4:
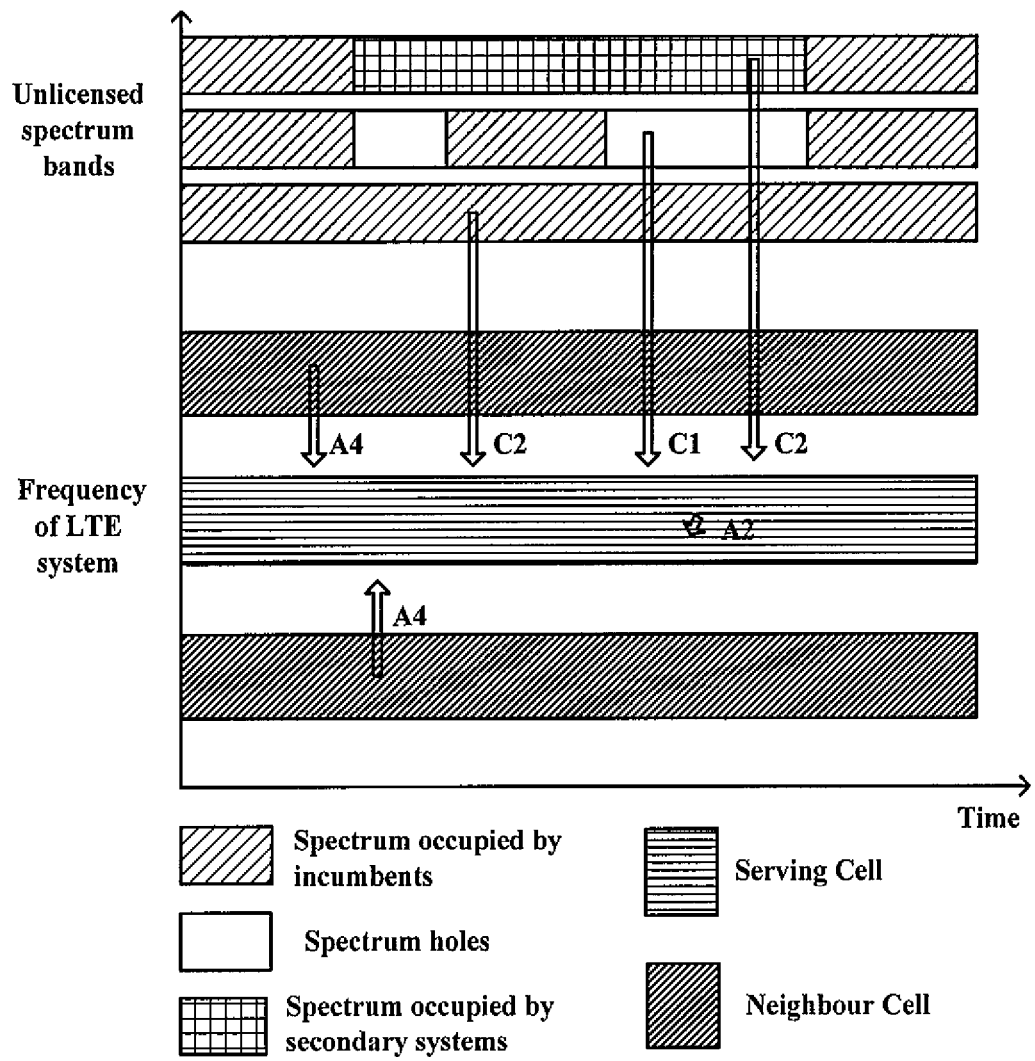
FIG. 4 is a schematic diagram illustrating some events that may arise in a cognitive LTE system.

FIG. 4 is a schematic diagram illustrating some events that arise in a cognitive LTE system. As illustrated in a time-frequency coordinate in FIG. 4, in the frequency band of the LTE system, the existing A4 event triggers measurement reports to be sent from the neighbor cells to the middle serving cell. The existing A2 event triggers measurements within the serving cell. For spectrum holes, a measurement report triggered by a C1 event as proposed by the present invention regarding the unlicensed spectrum bands may be sent to the serving cell working under the frequency band of the LTE system, as shown by an arrow. For spectrum bands occupied by incumbents or secondary systems, measurement reports triggered by C2 events as proposed by the present invention may be sent to the serving cell under the frequency band of the LTE system, as shown by two arrows.

Figure 5:
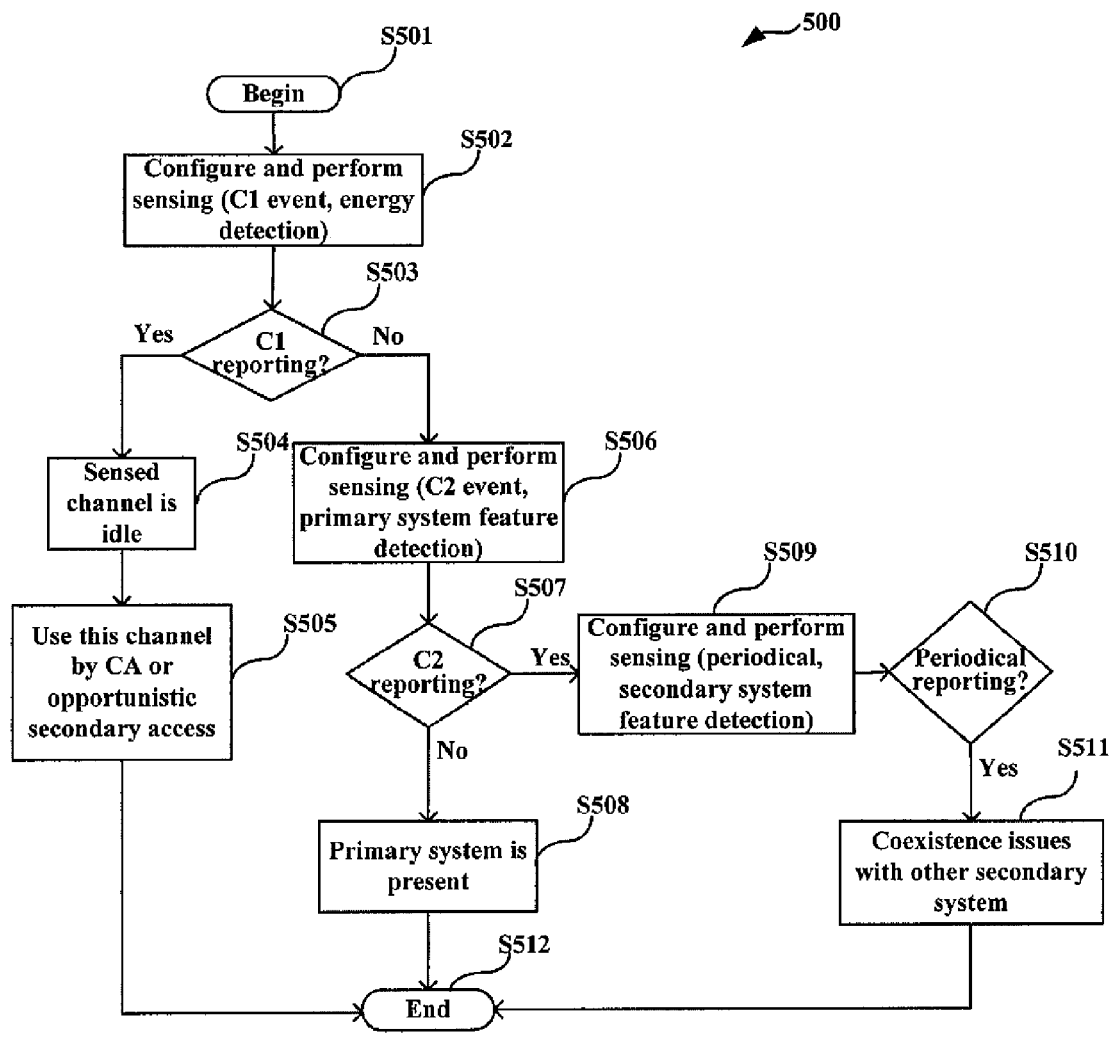
FIG. 5 is a flow chart schematically illustrating in detail a method for performing out-of-band sensing on an unlicensed frequency band according to another embodiment of the present invention.

FIG. 5 is a flow chart schematically illustrating in detail a method 500 for performing out-of-band sensing on an unlicensed frequency band according to another embodiment of the present invention. As illustrated in FIG. 5, the method 500 begins at step S501 and proceeds to step S502, at which the method 500 configures, via a configuration message, a UE to perform energy detection and to send to a BS a measurement report triggered by a C1 event if the measured energy detection value is less than a predetermined threshold. At step S503, the method 500 determines whether a C1 event triggered report is received or not. If the measurement report at issue is received by the BS, then at step S504, the method 500 determines the sensed channel is idle and at step S505, the method 500 directs the BS to use this sensed channel by CA or opportunistic secondary access. In this case, the method 500 ends at step S512.

If the measurement triggered by the C1 event is not received by the BS due to a large energy measurement value or measurement reporting failure, the method 500 advances to step S506, at which the method 500 configures, via a configuration message, the UE to perform sensing or measurement on a C2 event basis, i.e., measurement of a primary-system-feature detection value. As discussed before, if the measured detection value is less than a predetermined threshold ("Yes" at step S507), the method 500 then sends a measurement report to the BS. Otherwise, the method 500 advances to step S508, at which the method 500 determines that the primary system is present and thus the sensed channel is unsuitable for the LTE operations. In this case, the method 500 ends at step S512.

All things being equal, upon receipt of the measurement report triggered by the C2 event, the method 500 proceeds to step S509, at which the BS configures the UE to perform sensing (i.e., secondary system feature detection). As discussed previously, to distinguish the secondary systems, the UE may measure the secondary-system-feature detection value of the received signal on the channel to be sensed and periodically send the measure report to the BS upon determination at step S510. Then, at step S511, the method 500 judges or determines, by the BS, coexistence issues with other secondary systems through e.g., interference coordination.

It can be noted from the above discussion in connection with the method 500 that a number of approaches could be flexibly taken to ascertain the existence of the primary system and usability of the sensed channel. In other words, according to embodiments of the present invention, periodical reporting and C1 and C2 event triggered reporting mechanisms can be used separately or in any suitable combination manners so as to ferret out usable channels in the unlicensed frequency band.

In addition, the method 500 may involve further implemental details; however, the present invention is not limited thereto. Further, it should be noted herein that the steps and execution order as illustrated FIG. 5 are only examples and are not restrictive to the present invention. Those skilled in the art, after reading the present specification, can change these steps, for example, by omitting, combining, or adding certain steps, changing the execution order of certain steps so as to adapt to different application demands. For example, if the BS determines it may be better to perform primary feature detection first, then steps S502-S505 in the method 500 may be omitted. Additionally, according to different measurement configurations, the embodiments of the present invention can be advantageously applied to sense any suitable spectrum.

Figure 6:
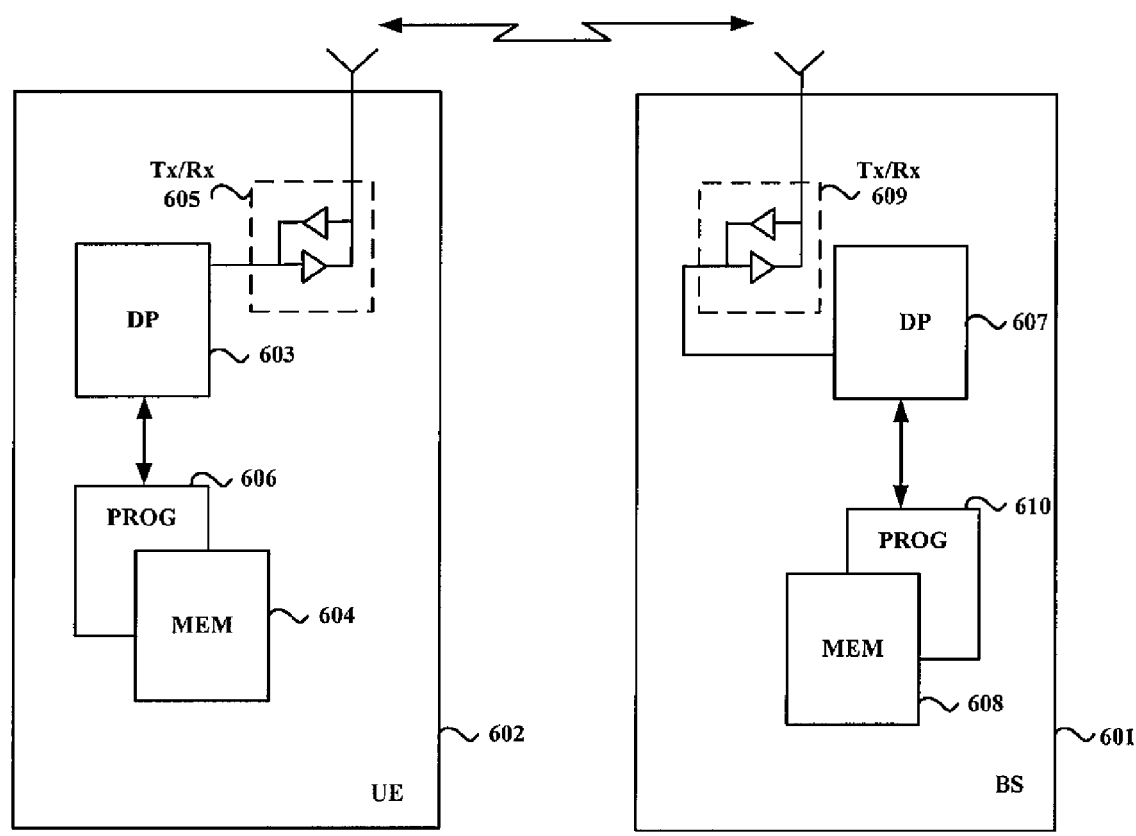
FIG. 6 is a schematic block diagram of a BS and a UE that are suitable for use in practicing the exemplary embodiments of the present invention.

FIG. 6 illustrates a simplified block diagram of a BS 601 and a UE 602 that are suitable for use in practicing the exemplary embodiments of the present invention. In FIG. 6, a wireless network is adapted for communication with the UE 602, which may be configured with capabilities of out-of-band sensing (e.g., by coarse and fine sensing, and reporting by a respective C1 or C2 event), via the BS (or eNB) 601. The UE 602 includes a data processor (DP) 603, a memory (MEM) 604 coupled to the DP 603, and a suitable RF transmitter TX and receiver RX 605 (which need not be implemented in a same component) coupled to the DP 603. The MEM 604 stores a program (PROG) 606. The TX/RX 605 is for bidirectional wireless communications with the BS 601. Note that the TX/RX 605 has at least one antenna to facilitate communication; multiple antennas may be employed for multiple-input multiple-output MIMO communications in which case the UE 602 may have multiple TXs and/or RXs.

The BS 601 includes a data processor (DP) 607, a memory (MEM) 608 coupled to the DP 607, and a suitable RF transmitter TX and receiver RX 609 coupled to the DP 607. The MEM 608 stores a program (PROG) 610. The TX/RX 609 is for bidirectional wireless communications with the UE 602. Note that the TX/RX 609 has at least one antenna to facilitate communication, though in practice a BS will typically have several. The BS 601 may be coupled via a data path to one or more external networks or systems, such as the internet, for example.

At least one of the PROGs 606 and 610 is assumed to include program instructions that, when executed by the associated DPs 603 and 607, enable the UE 602 and BS 601 to operate in accordance with the exemplary embodiments of this invention, as discussed herein with the methods 100, 200, 300, and 500.

In general, the various embodiments of the UE 602 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of the present invention may be implemented by computer software executable by one or more of the DPs 603, 607 of the UE 602 and the BS 601, or by hardware, or by a combination of software and hardware.

The MEMs 604 and 608 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 601 or UE 602, there may be several physically distinct memory units in the BS 601 or UE 602. The DPs 603 and 607 may be of any type suitable to the local technical environment, and may include one or more of general purpose computers, special purpose computers, microprocessors, digital signal processors (DSPs) and processors based on multicore processor architecture, as non limiting examples. Either or both of the UE 602 and the BS 601 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
measuring, by a user equipment, an energy detection value of a received signal on at least one unlicensed channel in an out-of-band frequency band of a primary system;
sending, by the user equipment, a first measurement report in response to the measured energy detection value of the received signal on the at least one unlicensed channel being less than a first predetermined threshold to enable use of the at least one unlicensed channel;
measuring, by the user equipment, a feature detection value of the received signal on the at least one unlicensed channel in the out-of-band frequency band of the primary system; and
sending, by the user equipment, a second measurement report to enable use of the at least one unlicensed channel, in response to the measured feature detection value of the received signal on the at least one unlicensed channel being less than a second predetermined threshold.

2. The method as recited in claim 1, wherein the measuring is based upon a configuration message received from a base station and the configuration message includes the first predetermined threshold and the second predetermined threshold.

3. The method as recited in claim 1, wherein signal strength of the primary system is lower than noise strength of the user equipment.

4. The method as recited in claim 1, wherein the measured energy detection value and the measured feature detection value are not less than the first and second predetermined thresholds, and wherein the method further comprises:
re-measuring, by the user equipment, the feature detection value of the received signal on the at least one unlicensed channel; and
periodically sending, by the user equipment, a measurement report regarding the re-measured feature detection value.

5. The method as recited in claim 1, wherein the measured feature detection value is less than the second predetermined threshold, and wherein the method further comprises:
measuring, by the user equipment, a secondary-system-feature detection value of the received signal on the at least one unlicensed channel; and
periodically sending, by the user equipment, a measurement report regarding the secondary-system-feature detection value.

6. The method as recited in claim 4, wherein the periodically sending is based upon a further configuration message received from a base station and the further configuration message is for configuring periodical sending of the measurement report regarding the re-measured feature detection value.

7. The method as recited in claim 1, wherein at least one of the first measurement report and the second measurement report includes information indicative of the at least one unlicensed channel.

8. A non-transitory computer-readable storage medium including program code which when executed by at least one processor causes operations comprising:
measuring an energy detection value of a received signal on at least one unlicensed channel in an out-of-band frequency band of a primary system;
sending a first measurement report in response to the measured energy detection value of the received signal on the at least one unlicensed channel being less than a first predetermined threshold to enable use of the at least one unlicensed channel;
measuring a feature detection value of the received signal on the at least one unlicensed channel in the out-of-band frequency band of the primary system; and
sending a second measurement report to enable use of the at least one unlicensed channel, when the measured feature detection value of the received signal on the at least one unlicensed channel is less than a second predetermined threshold.

9. An apparatus, comprising:
at least one processor and at least one memory including compute program code, the memory and the computer program code configured to cause the apparatus to at least:
measure an energy detection value of a received signal on at least one unlicensed channel in an out-of-band frequency band of a primary system;
send a first measurement report, in response to the measured energy detection value of the received signal on the at least one unlicensed channel being less than a first predetermined threshold to enable use of the at least one unlicensed channel;
measure a feature detection value of the received signal on the at least one unlicensed channel in the out-of-band frequency band of the primary system; and
send a second measurement report to enable use of the at least one unlicensed channel, when the measured feature detection value of the received signal on the at least one unlicensed channel is less than a second predetermined threshold.

10. The apparatus of claim 9, wherein the measuring is based upon a configuration message received from a base station, and the configuration message includes the first predetermined threshold and the second predetermined threshold.

11. The apparatus of claim 9, wherein signal strength of the primary system is lower than noise strength of the apparatus.

12. The apparatus of claim 9, wherein the measured energy detection value and the measured feature detection value are not less than the respective first and second predetermined thresholds, and wherein the memory and the computer program code are further configured to cause the apparatus to at least:
re-measure the feature detection value of the received signal on the at least one unlicensed channel; and
periodically send a measurement report regarding the re-measured feature detection value.

13. The apparatus of claim 12, wherein the periodically sending is based upon a further configuration message received from a base station, wherein the further configuration message is for configuring periodical sending of the measurement report regarding the re-measured feature detection value.

14. The apparatus of claim 9, wherein the measured feature detection value is less than the second predetermined threshold, and wherein the memory and the computer program code are further configured to cause the apparatus to at least:
measure a secondary-system-feature detection value of the received signal on the at least one unlicensed channel; and
periodically send a measurement report regarding the secondary-system-feature detection value.

15. The apparatus of claim 9, wherein at least one of the first measurement report and the second measurement report includes information indicative of the at least one unlicensed channel.

* * * * *